(12) United States Patent
Goto et al.

(10) Patent No.: US 7,135,158 B2
(45) Date of Patent: Nov. 14, 2006

(54) METHOD OF PURIFYING SINGLE WALL CARBON NANOTUBES

(75) Inventors: Hajime Goto, Wako (JP); Terumi Furuta, Wako (JP); Yoshiya Fujiwara, Wako (JP); Toshiyuki Ohashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 485 days.

(21) Appl. No.: 10/166,386

(22) Filed: Jun. 11, 2002

(65) Prior Publication Data

US 2003/0007924 A1 Jan. 9, 2003

(30) Foreign Application Priority Data

Jul. 5, 2001 (JP) ............................. 2001-204513
Apr. 15, 2002 (JP) ............................. 2002-111879

(51) Int. Cl.
*D01F 9/12* (2006.01)
(52) U.S. Cl. ..................... 423/447.1; 977/844
(58) Field of Classification Search ............... 423/460, 423/461, 447.1; 977/844
See application file for complete search history.

(56) References Cited

OTHER PUBLICATIONS

Liu et al., 'Fullerene Pipes' in Science vol. 280 pp. 1253-1256, May 22, 1998.*

Tohji et al., 'Purifying single-walled nanotubes' in *Nature* vol. 383, p. 679 (Oct. 24, 1996).*

* cited by examiner

*Primary Examiner*—Stuart Hendrickson
(74) *Attorney, Agent, or Firm*—Arent Fox PLLC

(57) ABSTRACT

There is provided a method of purifying single wall carbon nanotubes so as to be able to remove impurities such as a metal catalyst to obtain the single wall carbon nanotubes with high purity. The method includes the first oxidizing step of oxidizing the single wall carbon nanotubes soot 1 containing an impurity with a metal catalyst 2, the first refluxing step of refluxing the single wall carbon nanotubes soot 1 obtained by the first oxidizing step in an acid solution, the second oxidizing step of oxidizing the single wall carbon nanotubes soot 1 obtained by the first refluxing step, and the second refluxing step of refluxing the single wall carbon nanotubes obtained soot 1 by the second oxidizing step in an acid solution. The single wall nanotubes 1 are synthesized by an arc discharge with a carbon electrode containing a metal catalyst 2. The carbon electrode contains a metal catalyst which consists of Ni, Y, and Ti. The first oxidizing step is performed by heating at a temperature between 350 and 600° C. or by a wet-oxidization in hydrogen peroxide solution. The first refluxing step is performed by refluxing in nitric acid. The second oxidizing step is performed by wet-oxidizing in hydrogen peroxide. The second refluxing step is performed by refluxing in hydrochloric acid.

2 Claims, 2 Drawing Sheets

50nm

100nm

METHOD OF PURIFYING SINGLE WALL CARBON NANOTUBES

BACKGROUND OF THE INVENTION

1. Field of the Invention

The present invention relates to a method of purifying single wall carbon nanotubes.

2. Description of the Related Art

Single wall carbon nanotubes have a special structure with nanometer order. Due to the mechanical and structural properties derived from the special structure, the single wall carbon nanotubes are expected to be used in various applications such as a one-dimensional fine wire, a catalyst, a cold cathode device, and a hydrogen-storing substance.

The single wall carbon nanotubes, for example, can be prepared by discharging an arc between carbon electrodes in which linearly formed metal catalyst is embedded in an inert gas such as argon or helium. In the above-mentioned preparation, the single wall nanotubes grow linearly from particles of the metal catalyst and spherically form multi-layers of graphite carbons around the particles of the metal catalyst. Subsequently, amorphous carbons are formed around the carbon layers.

As a result, the obtained single wall nanotubes contain the graphite carbon layers, the amorphous carbons, and the metal catalyst as impurities. Since the single wall nanotubes contain particles of the metal catalyst, however, there is a problem with their proper function when they are applied to a cold cathode device, a hydrogen-storing substance and the like. It is, thus, necessary to remove the particles of the metal catalyst.

A metal catalyst consisting of Ni and Y is widely used in the above-mentioned preparation of single wall carbon nanotubes. It is, however, difficult to remove the metal catalyst consisting of Ni and Y since it becomes large particles having a diameter from 20 to 100 nm when it remains in the single wall carbon nanotubes. It is also difficult to process the metal catalyst homogeneously since its particle size is dispersed in a wide range as mentioned above. Therefore, it is considered a process of refluxing a single wall carbon nanotubes containing the impurities in nitric acid, for example, to be a method of removing the particles of the metal catalyst.

However, refluxing the single wall carbon nanotubes containing the impurities immediately in nitric acid can only achieve low removal efficiency since the metal catalyst is covered with layers of graphite carbons and thus longer time is required to remove the impurities sufficiently. Therefore, the single wall carbon nanotubes may be degraded. In addition, multi-layered graphite carbons formed around the metal catalyst are not fully removed in the above-mentioned process under reflux. Thus, the single wall carbon nanotubes have disadvantageously low purity.

SUMMARY OF THE INVENTION

It is an object of the present invention to eliminate such disadvantages and to provide a method of purifying the single wall carbon nanotubes so as to be able to obtain the single wall carbon nanotubes with high purity by removing impurities such as a metal catalyst.

To achieve the above object, the method of purifying single wall carbon nanotubes made with a metal catalyst in accordance with the present invention is characterized in that it comprises the first oxidizing step of oxidizing the single wall carbon nanotubes including a impurity, the first refluxing step of refluxing the single wall carbon nanotubes obtained by the first oxidizing step in an acid solution, the second oxidizing step of oxidizing the single wall carbon nanotubes obtained by the first refluxing step, and the second refluxing step of refluxing the single wall carbon nanotubes obtained by the second oxidizing step in an acid solution.

According to the present invention, the process begins with the first oxidizing step of oxidizing the single wall carbon nanotubes including an impurity made with a metal catalyst. In this step, the single wall carbon nanotubes soot contain multi-layered graphite carbons protecting metal catalyst and amorphous carbons as carbonaceous substances other than the single wall carbon nanotubes. The graphite carbon layers protecting metal catalyst are considered to have the slowest oxidization velocity and thus are most difficult to be removed among these carbonaceous substances.

In the first oxidizing step, however, the graphite carbon layers are oxidized and removed preferentially since the metal catalyst contained in the single wall carbon nanotubes acts as an oxidation catalyst for the carbonaceous substances. As a result, the layers of graphite carbons are removed and thus the metal catalyst is exposed. Subsequently, a part of the amorphous carbons is removed simultaneously.

The second process is the first refluxing step of refluxing the single wall carbon nanotubes soot, with its metal catalyst exposed by the first oxidizing step, in an acid solution. This process makes it easier to remove a large part of the metal catalyst which has been exposed by the first oxidizing step. This first refluxing step, however, does not remove the amorphous carbons which remained in the first oxidizing step.

The third process is the second oxidizing step of oxidizing the single wall carbon nanotubes soot processed in the first refluxing step. In the second oxidizing step, the single wall carbon nanotubes and the amorphous carbons may be oxidized competitively when the metal catalyst acts as an oxidation catalyst, which may cause a reduced yield of the single wall carbon nanotubes.

However, a large portion of the metal catalyst has been removed by the first refluxing step. Therefore, the amorphous carbons can be substantially removed in the second oxidizing step by oxidizing the amorphous carbons preferentially without reducing the yield of the single wall carbon nanotubes.

The fourth process is the second refluxing step of refluxing the single wall carbon nanotubes with its amorphous carbons removed substantially by the second oxidizing step in an acid solution. As a result, a residual metal catalyst can be substantially removed so as to be able to provide single wall carbon nanotubes with high purity.

The purifying method of the present invention can be applied, for example, to single wall nanotubes which has been synthesized by an arc discharge using an carbon electrode including the said metal catalyst. The metal catalyst may consist of Ni and Y, and preferably contains Ti as well. With the use of the metal catalyst consisting of Ni, Y, and Ti, a particle size of the metal catalyst included in the single carbon nanotubes may be as small as about 20 nm, and the sizes may be dispersed only in a narrow range. Furthermore, the graphite carbon layers formed around the metal catalyst may be thinner, which makes it possible to remove them easily.

The above-mentioned first oxidizing step is performed by heating the single wall carbon nanotubes containing impurities at a temperature between 350 and 600° C. in a gas phase. Combustion velocity of the graphite carbons is extremely low when the temperature of the oxidizing step is below 350° C. in the oxidizing step, and longer time is required for the process. Meanwhile, when the temperature of the oxidizing step is above 600° C., the single wall carbon nanotubes combust as well as the graphite carbon layers and the amorphous carbons causing to reduce the yield. Moreover, when the metal catalyst consists of Ni, Y, and Ti, Ti is oxidized upon the temperature of the oxidizing step exceeding 600° C., and $TiO_2$ is produced, which is exceptionally difficult to be removed.

Furthermore, the above-mentioned first oxidizing step may be performed by a wet-oxidization, in which the single wall carbon nanotubes including an impurity are refluxed in hydrogen peroxide solution at a temperature between 60 and 120° C. The temperature of the hydrogen peroxide solution lower than 60° C. may cause disadvantageously slow reaction, while the temperature higher than 120° C. may cause excessive vaporization.

The above-mentioned first refluxing step is performed by refluxing the single wall carbon nanotubes obtained by the first oxidizing step in nitric acid. Even if the metal catalyst is not fully exposed, nitric acid, which is an oxidative acid, can remove the graphite carbon layers around the catalyst by oxidizing them. As a result, nitric acid dissolves the exposed metal catalyst, and thus the metal catalyst can be effectively removed.

The above-mentioned second oxidizing step may be performed by heating the single wall carbon nanotubes which were obtained by the first refluxing step at a temperature between 350 and 600° C. in a gas phase as described in the first oxidizing step. However, the single wall carbon nanotubes may be degraded or its yield may be reduced when they are heated twice at the above-mentioned temperature ranges. Thus, the above-mentioned second oxidizing step preferably takes more moderate condition, for example, a wet-oxidization in which they are refluxed in hydrogen peroxide solution heated to a temperature between 60 and 100° C.

The above mentioned second refluxing step is performed by refluxing the single wall carbon nanotubes in hydrochloric acid. Hydrochloric acid does not oxidize the single wall carbon nanotubes as it is not oxidative and, thus, can substantially remove the residual metal catalyst which was not fully removed in the above-mentioned first refluxing step practically.

As a result, single wall carbon nanotubes with high purity can be provided according to the purifying method of the present invention.

EXAMPLE

Referring now to the attached figures, the first example of the present invention will be further described below.

In this example, and an arc discharge was performed at a current of 100 A and at a voltage of 30 V in a helium atmosphere of 0.055 MPa using a carbon electrode mixing Ni, Y, Ti and graphite in the atomic ratio of 2:2:2:94, respectively. Thereafter, grime containing single wall carbon nanotubes at high density was collected.

Figure 1:
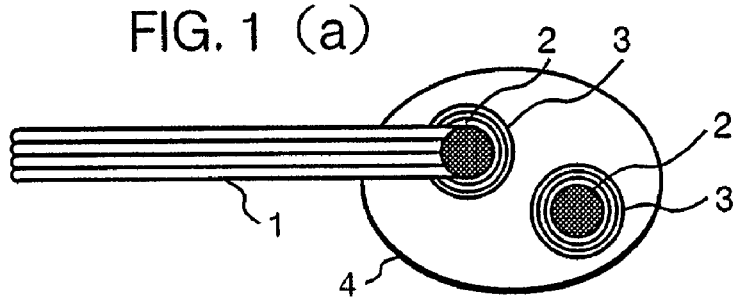
FIGS. 1(a)–(e) are schematic views showing states of the single wall carbon nanotubes in each step of the purifying method of the present invention.
Figure 1:
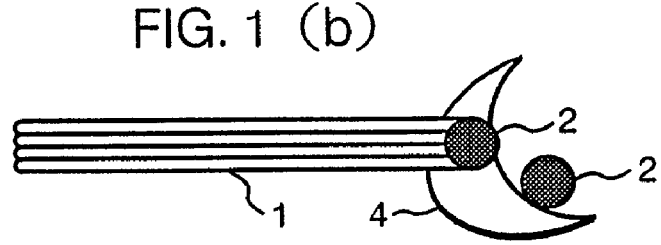
Figure 1:
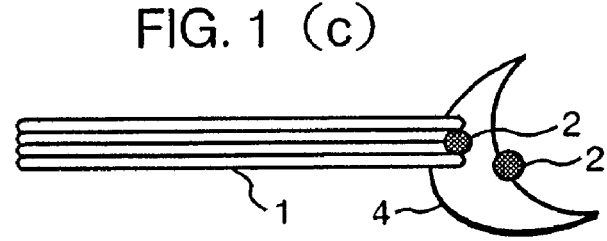
Figure 1:
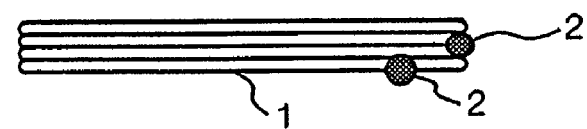
Figure 1:

As shown in FIG. 1(a), the single wall carbon nanotubes 1 contained in the grime grow linearly from the metal catalyst 2. Multi-shell carbons 3, which are spherically formed multi-layers of graphite carbons, are formed around the particles of the metal catalyst 2. In addition, amorphous carbon 4 is further formed around the multi-shell carbons 3.

Figure 2:
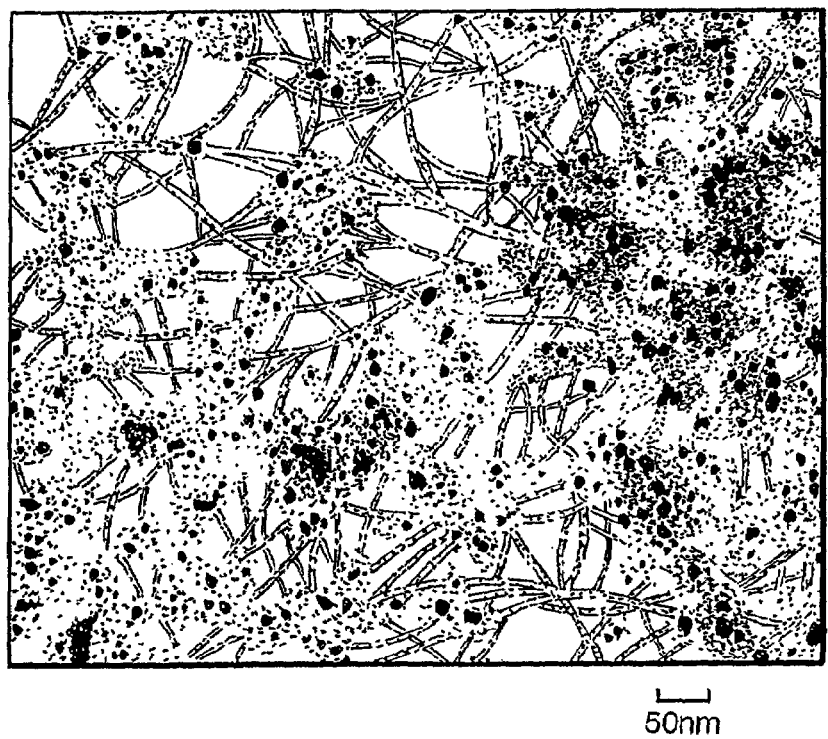
FIG. 2 is an electron micrograph showing the single wall carbon nanotubes before being subjected to the purifying method of the present invention.

The state of the single wall carbon nanotubes of FIG. 1(a) is shown in FIG. 2 as an electron micrograph. The metal catalyst 2 cannot be seen in FIG. 2 since it is covered with the multi-shell carbons 3.

Then, the above-mentioned grime was measured to give 400 mg, and fed into a 200 ml conical flask. Thereafter, the flask was held at 500° C. for one hour in a heating furnace to conduct the first oxidizing step in the atmosphere. After the oxidizing step, the conical flask was set aside from the heating furnace to allow air-cooling and 220 mg of grime was collected.

As shown in FIG. 1(b), multi-shell carbons 3 are removed from the grime after being subjected to the first oxidizing step to expose the metal catalyst 2 and has a part of amorphous carbon 4 is removed.

Subsequently, the grime after being subjected to the first oxidizing step was incorporated in 100 ml of 3M nitric acid and dispersed it homogeneously by irradiating an ultrasonic wave for 10 minutes. Thereafter, the first refluxing step was performed, in which the grime is refluxed in an oil bath heated to 120° C. for 16 hours. After the refluxing step, the refluxed solution was cooled and the grime was filtered with a paper filter having the pore size of 5 µm and was washed with 300 ml or more distilled water. The washed grime was dried with a heating plate at 70° C. in the atmosphere, and 140 mg of grime was collected.

As shown in FIG. 1(c), a large part of the metal catalyst 2 dissolved by the nitric acid and removed from the grime after being subjected to the first refluxing process. The residual metal catalyst 2 contained in the grime substantially consists of Ti.

Then, the grime after being subjected to the first refluxing step was incorporated in 90 ml of distilled water and dispersed homogeneously by irradiating an ultrasonic wave for 10–30 minitues, and subsequently, mixed it with 210 ml of 35% hydrogen peroxide solution. Thereafter, the mixture of the distilled water containing the grime and the hydrogen peroxide solution was subjected to the second oxidizing step in which the mixture was wet-oxidized by refluxing in an oil bath heated at 80° C. for 24 hours. The temperature of the oil bath may be set within a range of 60–100° C.

After the second oxidizing step, the refluxed solution was cooled and filtered with a paper filter having the pore size of 0.2–0.5 µm and was washed with 300 ml or more distilled water. The washed grime was dried with a heating plate at 70° C. in the atmosphere, and 80 mg of grime was collected.

As shown in FIG. 1(d), amorphous carbons are removed from the grime after being subjected to the second oxidizing process, and the single wall carbon nanotubes 1 and metal catalyst 2 which were not removed in the first refluxing process remain.

Then, the grime after being subjected to the second oxidizing process was incorporated in 80 ml of 96% hydrochloric acid and dispersed homogeneously by irradiating an ultrasonic wave for 10 minitues, and subsequently performed the second refluxing step, in which the grime was refluxed in an oil bath heated to 120° C. for 12 hours. After the second refluxing step, the refluxed solution was cooled and the grime was filtered with a paper filter having a pore size of 5 μm and was washed with 300 ml or more distilled water. The washed grime was dried with an heating plate at 70° C. in the atmosphere, and 70 mg of single wall carbon nanotubes were collected.

As shown in FIG. 1(e), the metal catalyst 2 which was not removed in the first refluxing step was removed to provide single wall carbon nanotubes 1 with high purity as a result of the second refluxing process.

Figure 3:
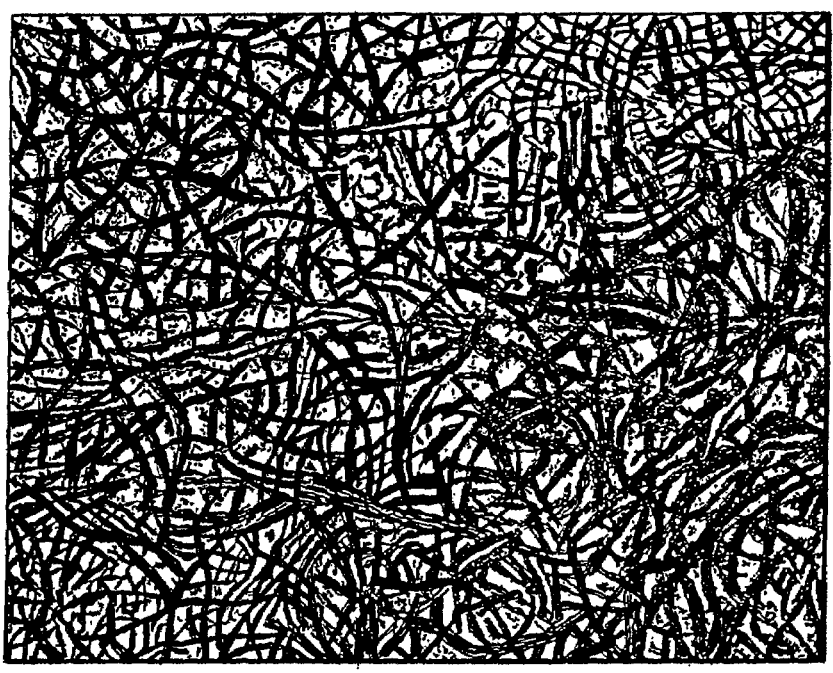
FIG. 3 is an electron micrograph showing the single wall carbon nanotubes after being subjected to the purifying method of the present invention.

The state of the single wall carbon nanotubes of the FIG. 1(e) is shown in the FIG. 3 as an electron micrograph. It is apparent from the FIG. 3 that the metal catalyst 2 as an impurity, multi-shell carbon 3, and amorphous carbon 4 are removed so as to provide single wall carbon nanotubes 1 with high purity according to the purifying method of the present invention.

Although the second oxidizing step is performed by a wet-oxidization, the grime after the first refluxing step may be heated in the gas phase at a temperature between 350 and 600° C.

Next, the second example of the present invention will be described below.

In this example, 1 g of grime obtained by the same procedure as the fist example and 100 ml of distilled water were incorporated in a pressure vessel and then sealed. Thereafter, the vessel was placed in an oven at 200° C. and held for 3 hours. Then, the vessel was removed from the oven and allowed to cool to the room temperature. The mixture of the grime and the distilled water was taken out from the vessel, and 100 ml of distilled water was added to the mixture. It was stirred with a magnetic stirrer for 30 minutes, and an ultrasonic wave was irradiated for 5 minutes to provide grime-dispersed water in which the grime was dispersed homogeneously in the water.

Thereafter, the grime-dispersed water was mixed with 400 ml of 30% hydrogen peroxide solution and subjected to the first oxidizing step by performing a wet-oxidization which refluxed the grime-dispersed water for 24 hours at a temperature of 120° C. After the oxidizing step, the grime was filtered with a paper filter having the pore size of 5 μm and was washed with 300 ml of distilled water.

The grime after being subjected to the first oxidizing step was kept away from dryness and fed into 350 ml of distilled water. After stirring it with the magnetic stirrer for 30 minutes, an ultrasonic wave was irradiated for 5 minutes to disperse it homogeneously. Then, the grime-dispersed water was mixed with 150 ml of 60% nitric acid and subjected to the first refluxing step which refluxed the grime-dispersed water for 24 hours at a temperature of 120° C. After the refluxing step, the grime was filtered with a paper filter having the pore size of 5 μm and was washed with 1000 ml of distilled water.

The grime after being subjected to the first refluxing step was kept away from dryness and fed into 200 ml of distilled water. After stirring it with the magnetic stirrer for 30 minutes, an ultrasonic wave was irradiated for 5 minutes to disperse it homogeneously. Subsequently, the grime-dispersed water was mixed with 400 ml of 30% hydrogen peroxide and subjected to the second oxidizing step by performing a wet-oxidization which refluxed the grime-dispersed water for 24 hours at a temperature of 100° C. After the oxidizing step, the grime was filtered with a paper filter having the pore size of 5 μm and was washed with 300 ml of distilled water.

The grime after being subjected to the second oxidizing step was fed into 80 ml of 96% hydrochloric acid and was homogeneously dispersed by irradiating an ultrasonic wave for 10 minutes. Then, the second refluxing step was performed by refluxing the grime-dispersed water in an oil bath heated at 120° C. for 12 hours.

The grime after being subjected to the second refluxing step was kept away from dryness and fed into 1000 ml of sodium hydroxide solution with pH 9. After stirring it with the magnetic stirrer for 30 minutes, an ultrasonic wave was irradiated for 5 minutes to disperse it homogeneously. The grime was subsequently filtered with a paper filter having the pore size of 5 μm and was washed with 1000 ml of distilled water. The washed grime was dried in an oven at a temperature of 70° C. for 3 hours and 120 mg of single wall carbon nanotubes 1 was collected.

As the result of this example, the single wall carbon nanotubes 1 with high purity in which the metal catalyst 2 was removed were collected as shown in FIG. 1(e).

What is claimed is:

1. A method of purifying single wall carbon nanotubes comprising the steps of:
   synthesizing said single wall carbon nanotubes by an arc discharge with a carbon electrode comprising a metal catalyst consisting of Ni, Y and Ti thereby preparing single wall carbon nanotubes including an impurity which comprises the metal catalyst where the single wall carbon nanotubes grow linearly from multi-shell carbons which are spherically formed multilayers of graphite carbons formed around particles of the metal catalyst, and amorphous carbon formed around the multi-shell carbons;
   then, oxidizing the single wall carbon nanotubes including the impurity removing multi-shell carbons to expose the metal catalyst and removing a part of the amorphous carbon;
   then, refluxing the single wall carbon nanotubes in an acid solution for dissolving and removing a large part of the metal catalyst;
   then, again oxidizing the single wall carbon nanotubes removing the remaining amorphous carbon; and
   then, again refluxing the single wall carbon nanotubes in an acid solution removing the remaining metal catalyst.

2. The method of purifying single wall carbon nanotubes as claimed in claim 1, wherein said carbon electrode includes the metal catalyst consisting of Ni, Y and Ti and graphite in the atomic ratio of Ni:Y:Ti:graphite=2:2:2:94.

* * * * *